3,419,654
PROCESS FOR MAKING IMPROVED FILMS FROM SAPONIFIED ETHYLENE-VINYL ACETATE COPOLYMERS
Teiichiro Chiba, Kazuo Hiramatsu, and Katsuaki Hirano, Kurashiki-shi, Japan, assignors to Kurashiki Rayon Co., Ltd., Okayama Prefecture, Japan, a corporation of Japan
Filed Nov. 25, 1964, Ser. No. 413,877
Claims priority, application Japan, Dec. 6, 1963, 38/65,492
6 Claims. (Cl. 264—210)

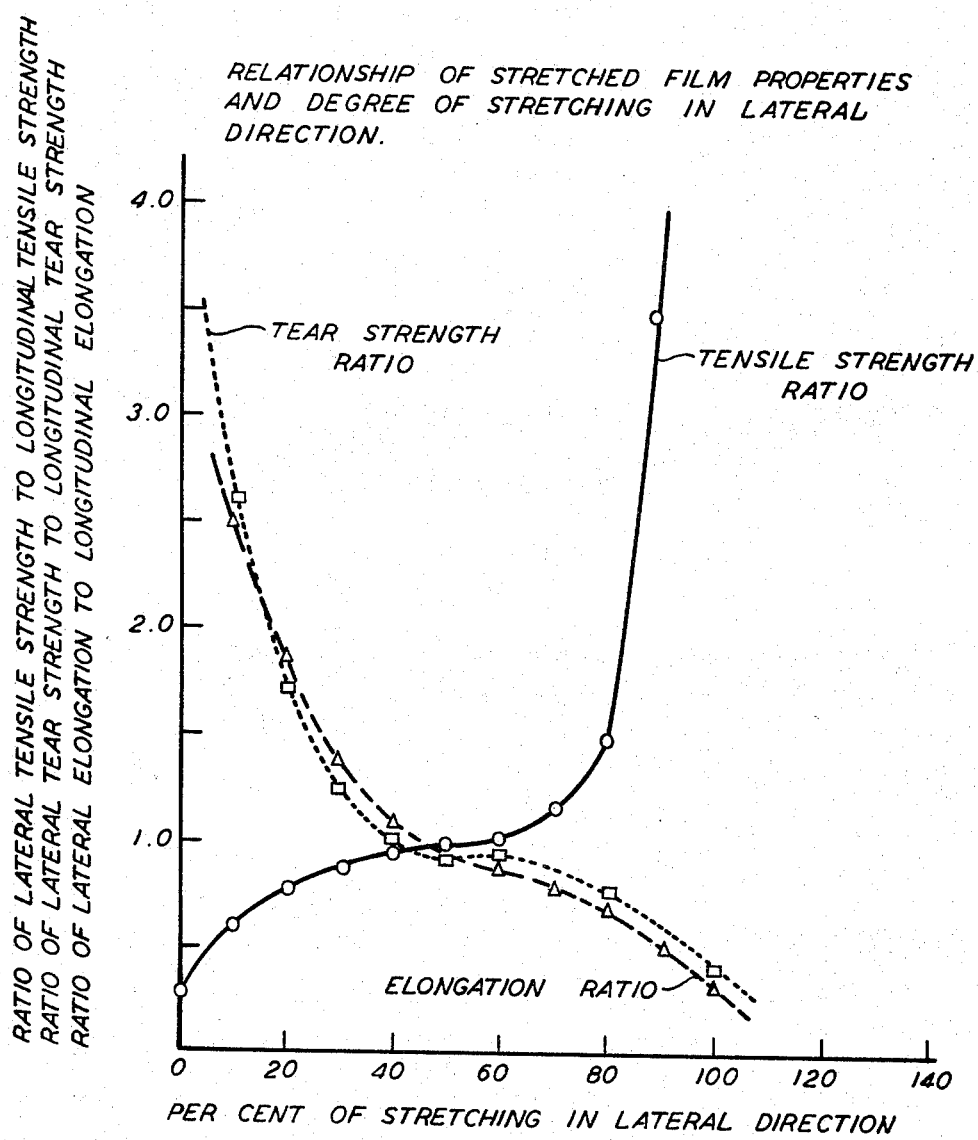

ABSTRACT OF THE DISCLOSURE

Films are prepared having a low degree of orientation and a high degree of strength and dimensional stability by stretching extruded saponified ethylene vinyl acetate copolymers in a lateral direction, i.e., at right angles to the direction in which the film is extruded, and subsequent to the stretching heat treating the film. The saponified ethylene-vinyl acetate copolymer is the product obtained by saponifying more than about 90 mole percent of the vinyl acetate groups in a 30 to 70 mole percent ethylene and 30 to 70 mole percent vinyl acetate-ethylene copolymer.

---

This invention relates to improved film materials and improved methods and procedures for manufacturing film materials, wherein the film materials have improved and advantageous properties and characteristics, and is more particularly concerned with improved film materials having a low degree of orientation and high dimensional stability and prepared from saponified ethylene-vinyl acetate copolymers.

Generally, it is known that film materials and packaging films prepared from saponified ethylene-vinyl acetate copolymers have desirable properties with regard to strength, transparency, and low tendency to accumulate a static electric charge. These films having desirable strength, transparency, and electric characteristics are disclosed and described in copending U.S. patent application Ser. No. 133,295, filed Aug. 23, 1961, now U.S. Patent No. 3,183,203.

It has been found that saponified ethylene-vinyl acetate copolymer materials exhibit certain characteristics and properties of both polyethylene and polyvinyl alcohol. For this reason, the saponified ethylene-vinyl acetate copolymers have the property or characteristic of absorbing moisture, similar to polyvinyl alcohol. While the saponified ethylene-vinyl acetate copolymers may not absorb the same degree or same amount of moisture as polyvinyl alcohol, this moisture absorption is a disadvantage and a drawback in utilizing films prepared from saponified ethylene-vinyl acetate copolymers, in that these films will have unsatisfactory properties and characteristics with regard to dimensional stability. Also it has been found that films prepared by the extrusion of saponified ethylene-vinyl acetate copolymers exhibit a certain degree of orientation, and because of the orientation and the moisture absorbing properties of the film the films will exhibit undesirable and unsatisfactory properties with regard to dimensional stability. Further, the degree of strength or the strength properties of these films is dependent to a large degree on the orientation characteristics of the film. That is, films having a high degree of orientation will show a low degree of strength. These defects or disadvantages or unsatisfactory properties and characteristics associated with films prepared by the extrusion of saponified ethylene-vinyl acetate copolymers present problems and difficulties in the utilization of these films and the practical application of these films, and are drawbacks in the practical applications of these films.

It is, therefore, an object of this invention to provide improved materials from saponified ethylene-vinyl acetate copolymers, including improved film materials.

Another object of this invention is to provide improved methods, improved techniques, and improved procedures for the preparation and manufacture of saponified ethylene-vinyl acetate copolymer film materials having a high degree of dimensional stability and a low degree of orientation.

These and other objects, as well as other advantages and other benefits of this invention, and other novel and specific features of this invention, will become apparent, or will be clarified or will be described or specifically detailed, in the following descriptions, drawings, illustrations, details, and examples of this invention.

In accordance with this invention, improved materials and improved film materials are prepared from specific saponified ethylene-vinyl acetate copolymers by improved procedures involving film treatment after film forming or extrusion. These film materials having a low degree of orientation and a high degree of dimensional stability are prepared by extruding the saponified ethylene-vinyl acetate copolymer and stretching the extruded film in a lateral direction or at a right angle to the film forming direction or at approximately a right angle to the film forming direction. Conventional apparatus for preparation of films by extrusion is useful in preparing the films of this invention. It has been found that lateral elongation or lateral stretching of the extruded films of this invention, under appropriate conditions, results in film materials exhibiting a low degree of orientation and a high degree of strength and a high degree of dimensional stability.

The saponified ethylene-vinyl acetate copolymers useful in the procedures of this invention are prepared from ethylene-vinyl acetate copolymers. The ethylene-vinyl acetate copolymer should contain about 30 mol percent to about 70 mol percent ethylene and should contain about 30 mol percent to 70 mol percent vinyl acetate. The ethylene-vinyl acetate copolymer may be saponified by utilizing the conventional saponification techniques used to saponify polyvinyl acetate. The saponification should be conducted to a sufficient extent so that at least 90% of the vinyl acetate groups in the ethylene-vinyl acetate copolymer are converted or saponified to vinyl alcohol groups. It is preferred that more than 90% of the vinyl acetate groups be converted to vinyl alcohol groups. The saponified ethylene-vinyl acetate copolymer may be termed an ethylene-vinyl alcohol copolymer containing from about 30 mol percent to about 70 mol percent ethylene and from at least 27 mol percent vinyl alcohol to at most 70 mol percent vinyl alcohol. The conversion value can more properly be termed the degree of saponification or degree of hydrolysis and identifies the mol percent of vinyl acetate units in the ethylene-vinyl acetate copolymer that have been converted to vinyl alcohol units by saponification. To obtain the improved films of this invention, the film prepared from the saponified ethylene-vinyl acetate copolymer is stretched or elongated to certain specific values. The film may be stretched immediately after the film forming by extrusion or may be subject to a temporary cooling process after extrusion. The film extrusion direction is termed the longitudinal direction and the stretching direction is termed the lateral direction and should be at least approximately at a right angle to the film forming or longitudinal direction. The film width is increased from 10% to 80% of its original extruded width by stretching in the lateral direction. The stretching is conducted at a temperature below 140° C., and the stretched film is heat treated at a temperature of 70° C. to 140° C. The film material or film product obtained after the heat treatment is generally less than 1 mm. in thickness and exhibits very little orientation and has a high degree of strength, including tensile strength, elongation, and tear strength; further, this film product has a very good dimensional stability characteristics and has a very good appearance and is very useful, especially as a packaging film.

It is preferred to prepare the film materials of this invention by stretching in the previously described lateral direction; however, it is possible to stretch the film in a longitudinal direction at the same time the film is being stretched in the lateral direction to obtain satisfactory film. Further, allowing shrinkage in the longitudinal direction during the lateral direction stretching is possible.

The glass transition temperature calculated from the specific volume temperature relationships of the saponified ethylene-vinyl acetate copolymer is dependent on various factors, as the amounts of ethylene and vinyl acetate groups in the copolymer and the water content and the presence of additional materials as plasticizers, lubricants, coloring agents and stabilizers. The glass transition temperature is important, in that one is limited to certain temperatures permitting elongation or stretching and these limits are dependent on the glass transition temperature. A saponified copolymer containing 30 mol percent ethylene and 70 mol percent vinyl alcohol units has a glass transition temperature of about 60° C. Increasing the amount of ethylene in the saponified copolymer results in a decrease in the glass transition temperature. In the case of a saponified copolymer containing 70 mol percent ethylene and 30 mol percent vinyl alcohol units, the glass transition temperature is about 20° C. The stretching temperature should be higher than the glass transition temperature. On the other hand a saponified copolymer containing 30 mol percent ethylene and 70 mol percent vinyl alcohol units has a melting point of about 165° C., and in the case of a saponified copolymer containing 70 mol percent ethylene and 30 mol percent vinyl alcohol units, the melting point is about 145° C. It has been found that stretching of films prepared from the specific saponified ethylene-vinyl acetate copolymers described herein at temperatures above about 140° C. is impractical and is very difficult and presents many problems. Because of the above-mentioned temperature properties of the saponified copolymers, it has been found that the film should be stretched at a temperature below 140° C.; it is preferred that the stretching procedures of this invention be conducted at a temperature between 60° C. and 120° C.

In FIGURE 1 there is illustrated pertinent data relating to the procedures of this invention. In FIGURE 1 there is shown a series of curves illustrating the relationship between the degree of lateral elongation or stretching and the orientation or stretched film strength properties of films of this invention. The material and strength property values illustrated in FIGURE 1 were obtained from films prepared by the extrusion of a saponified ethylene-vinyl acetate copolymer containing 40 mol percent of ethylene and 60 mol percent of vinyl acetate and where 99 mol percent of vinyl acetate groups were converted to vinyl alcohol groups. These films were subjected to stretching in the lateral direction at a temperature of 100° C. There was no stretching of the film in the longitudinal direction. The elongation speed or stretching speed in the lateral direction was 10 meters per minute. After the lateral stretching the films were heat treated at 100° C. for 10 seconds in the stretched condition. From FIGURE 1, it will be readily seen that certain values of lateral stretching are important in obtaining films having a low degree of orientation and other satisfactory film properties. It has been found that films having satisfactory and desirable properties with regard to orientation and strength and directional stability characteristics can be prepared by stretching in a lateral direction whereby the film width is increased from 10% to 80%. It is preferred that the lateral stretching procedures result in an increase of film width from 30% to 60% of the original film width.

Also, it has been found that the film after being stretched should be maintained in the stretched condition and heat set by heat treatment procedures and where the temperature of heat treatment is in the range of the stretching temperature and below the melting point; and it is preferred that the film be heat set at a temperature within the range of 70° C. to 140° C.

While this invention has been described more particularly in terms of film preparation from specific saponified ethylene-vinyl acetate copolymers, it is known to add additional materials in small amounts to the specific copolymers to prepare the film forming mixture. It has been found that small amounts of materials as plasticizers, lubricants, coloring agents, or stabilizers may be added to the saponified ethylene-vinyl acetate copolymer to prepare films and these films may be treated according to the procedures of this invention to obtain desirable films having improved properties with regard to a low degree of orientation and a high dimensional stability and a high degree of strength.

The following additional examples are illustrative of the inventive materials, inventive and novel procedures, and inventive methods and techniques of this invention, and are not intended to limit the scope or area of the herein described invention. In the following examples the tensile strength and tear strength were measured according to procedures described in Japanese Industrial Standards, JIS, Z, 1702. The values regarding the dimensional changes of the film were measured by immersing film in water at a temperature of 30° C. for 1 hour. The plus (+) sign next to said values indicates an increase in length and the minus (—) sign indicates a decrease in length after said immersion in water.

Example 1

An ethylene-vinyl acetate copolymer was prepared containing 30 mol precent ethylene and 70 mol percent vinyl acetate. The copolymer was saponified and 98% of the vinyl acetate groups were converted to vinyl alcohol groups. Films were prepared from the saponified ethylene-vinyl acetate copolymer by extrusion using a film forming extruder. The film forming extrusion die temperature was 180° C. The extruded film was then passed over a cooling roll maintained at a temperature of 20° C. and after passing over the cooling roll was immediately stretched in a lateral direction while at a temperature of 100° C. The speed of lateral stretching or elongation was 15 meters per minute. The amount of lateral stretching was sufficient to increase the original film width by 25%. After the film was stretched it was maintained in the stretched condition and heat treated at 100° C. for 10 seconds. Other films were prepared utilizing the same procedures, with the execption that the stretching treatment was omitted. The films not receiving the stretching treatment were found to have a higher degree of orientation and a higher degree of dimensional change when compared to the films receiving the stretching treatment. Films were also prepared utilizing the above procedures but eliminating the stretching and heat treatment procedures; these films were the original films taken up after passage over the cooling roll. In the following Table I, there is illustrated the properties of the films prepared according to the invention and the original film taken up after passage over the cooling roll.

TABLE I

|  | Original film | Stretched film |
|---|---|---|
| Thickness, mm | 0.03 | 0.03 |
| Tensile strength, kg./mm.$^2$: |  |  |
| Longitudinal | 15.0 | 12.0 |
| Lateral | 5.0 | 8.0 |
| Elongation, percent: |  |  |
| Longitudinal | 52 | 150 |
| Lateral | 330 | 280 |
| Tear strength, kg./mm.: |  |  |
| Longitudinal | 2.8 | 3.8 |
| Lateral | 8.0 | 5.8 |
| Dimensional change due to absorption of water, percent: |  |  |
| Longitudinal | +15.3 | +1.0 |
| Lateral | −12.4 | −0.5 |
| Appearance | (1) | (2) |

[1] Good.
[2] Excellent.

Example 2

An ethylene-vinyl acetate copolymer containing 45% ethylene and 55% vinyl acetate was saponified whereby 99% of the vinyl acetate groups were converted to vinyl alcohol groups to obtain a saponified ethylene-vinyl acetate copolymer. There was added 10% by weight of glycerine to the saponified ethylene-vinyl acetate copolymer to form an extrusion film forming mixture. The glycerine functioned as a plasticizer. The mixture was then extruded through a film forming die maintained at a temperature of 180° C. The film was subjected to stretching in a lateral direction whereby the original width was increased 50%, and simultaneously the film was stretched in a longitudinal direction whereby the film length was increased 10%. The stretching was conducted at a temperature of 120° C. While maintaining the film in the stretched condition the film was heat treated or heat set at 120° C. for 3 seconds. The stretching speed in the lateral direction was 20 meters per minute and in the longitudinal direction was 4 meters per minute. For comparison purposes additional films were prepared utilizing the above procedures with the exception that the lateral and longitudinal stretching was omitted. These films were subjected to the heat treatment at 120° C. for 3 seconds. In comparing the films subjected to the stretching procedures of this invention with the films that were not subjected to the stretching procedures, it was found that the stretched films exhibited a lower degree of orientation and had a better appearance and had improved dimensional stability characteristics after water absorption tests, when compared to the films not subjected to the stretching procedures. A comparison of the film properties and characteristics of these two films is illustrated in the following Table II.

TABLE II

|  | Film receiving heat treatment only | Stretched film |
|---|---|---|
| Thickness, mm | 0.02 | 0.02 |
| Tensile strength, kg./mm.$^2$: |  |  |
| Longitudinal | 9.3 | 7.2 |
| Lateral | 2.3 | 6.9 |
| Elongation, percent: |  |  |
| Longitudinal | 160 | 255 |
| Lateral | 380 | 260 |
| Tear strength, kg./mm.: |  |  |
| Longitudinal | 3.2 | 8.0 |
| Lateral | 15.0 | 8.3 |
| Dimensional change due to absorption of water, percent: |  |  |
| Longitudinal | +1.5 | +0.4 |
| Lateral | −0.8 | −0.3 |
| Appearance | (1) | (2) |

[1] Good.
[2] Excellent.

Example 3

An ethylene-vinyl acetate copolymer was prepared containing 55 mol percent ethylene and 45 mol percent vinyl acetate. The prepared copolymer was subjected to saponification procedures and 99.9% of the vinyl acetate groups were converted to vinyl alcohol groups to prepare a saponified ethylene-vinyl acetate copolymer. Films were prepared from the saponified ethylene-vinyl acetate copolymer by extrusion and the extrusion die temperature was 190° C. The extruded film was then passed over a cooling roll maintained at 65° C. The cooled film was then passed to a stretching zone where the film was stretched in a lateral direction at a temperature of 65° C. The extent of lateral stretching was sufficient to increase the original film width by 30%. After stretching the film was maintained in the stretched condition and heat treated for 10 minutes at a temperature of 80° C. The speed of the lateral stretching was 10 meters per minute. The film was not stretched in the longitudinal direction. Utilizing the previously described procedures similar films were prepared where the stretching procedures were omitted, but where the film was subjected to the same conditions of heat treatment. A comparison of the properties of the films subjected to the stretching procedures of this invention and the films not subjected to the stretching procedures is given in Table III.

TABLE III

|  | Film given heat treatment only | Stretched film |
|---|---|---|
| Film thickness, mm | 0.03 | 0.03 |
| Tensile strength, kg./mm.$^2$: |  |  |
| Longitudinal | 13.8 | 11.5 |
| Lateral | 3.8 | 9.2 |
| Elongation, Percent: |  |  |
| Longitudinal | 85 | 190 |
| Lateral | 375 | 270 |
| Tear strength, kg./mm.: |  |  |
| Longitudinal | 2.2 | 6.0 |
| Lateral | 10.2 | 7.8 |
| Dimensional change due to absorption of water, percent: |  |  |
| Longitudinal | +9.0 | +0.5 |
| Lateral | −6.0 | −0.3 |
| Appearance | (1) | (2) |

[1] Good.
[2] Excellent.

While preferred embodiments and examples of this invention have been described and illustrated, it is to be understood that satisfactory and different modifications of the invention may be made without departing from the spirit and scope of the invention. The herein described invention is not to be limited by the foregoing details or descriptions or illustrations or foregoing examples, except as defined in the following claims.

We claim:

1. A method of manufacturing improved films from saponified ethylene-vinyl acetate copolymers which comprises, preparing a film from a saponified ethylene-vinyl acetate copolymer, said saponified ethylene-vinyl acetate copolymer being prepared from an ethylene-vinyl acetate copolymer containing from 30 mol percent to 70 mol percent of ethylene and from 30 mol percent to 70 mol percent of vinyl acetate and where more than about 90 mol percent of said vinyl acetate groups in said copolymer are converted to vinyl alcohol groups, said film being prepared by extruding said saponified ethylene-vinyl acetate copolymer;

increasing the width of said prepared film by stretching said film in a lateral direction to the extrusion direction of said film at a temperature within the range of 60° C. and 120° C.

said stretching being sufficient to increase the original width of said film by an amount from 10% to 80%;

and maintaining said stretched film in said stretched condition and heat treating said stretched film at a temperature within the range of 70°C. to 140°C.

2. A method according to claim 1, wherein said film after extrusion and prior to said stretching procedure is cooled.

3. A method according to claim 1, wherein said film during said stretching in said lateral direction is subjected to a simultaneous stretching in a longitudinal direction.

4. A method according to claim 1, wherein said saponified ethylene-vinyl acetate copolymer extruded to prepare said film contains additional materials selected from the group consisting of plasticizers, lubricants, coloring agents, and stabilizers, prior to said extrusion.

5. A method according to claim 1, wherein said stretching in said lateral direction is sufficient to increase said film width by an amount from 30% to 60%.

6. A method according to claim 1, wherein said saponification of said ethylene-vinyl acetate copolymer is conducted to a sufficient extent to convert about 100 mol percent of said vinyl acetate units in said copolymer to vinyl alcohol units.

References Cited

UNITED STATES PATENTS

| | | | |
|---|---|---|---|
| 3,114,736 | 12/1963 | Bartl et al. | 260—87.3 |
| 3,183,203 | 5/1965 | Yoshimura et al. | 260—33.4 |
| 3,244,680 | 4/1966 | Holladay et al. | 264—288 |

FOREIGN PATENTS 3,823,336  1/1963  Japan.

JULIUS FROME, *Primary Examiner.*

H. H. MINTZ, *Assistant Examiner.*

U.S. Cl. X.R.

264—288, 289, 345